United States Patent
Liu

(10) Patent No.: US 11,732,800 B1
(45) Date of Patent: Aug. 22, 2023

(54) APPARATUS FOR AVOIDING DISPOSITION OF CLUTCH OF VEHICLE SPEED CHANGE DEVICE

(71) Applicant: Jen-Chih Liu, New Taipei (TW)

(72) Inventor: Jen-Chih Liu, New Taipei (TW)

(73) Assignee: NEW KAILUNG GEAR CO., LTD., Kaohsiung (TW)

( * ) Notice: Subject to any disclaimer, the term of this patent is extended or adjusted under 35 U.S.C. 154(b) by 0 days.

(21) Appl. No.: 17/729,002

(22) Filed: Apr. 26, 2022

(51) Int. Cl.
*F16H 63/34* (2006.01)

(52) U.S. Cl.
CPC ................ *F16H 63/3416* (2013.01)

(58) Field of Classification Search
CPC ............. F16H 63/3416; F16H 63/3425; F16H 2063/025
See application file for complete search history.

(56) References Cited

U.S. PATENT DOCUMENTS

| 10,975,918 | B2* | 4/2021 | Park ...................... F16D 13/32 |
| 11,035,466 | B2* | 6/2021 | Weigelt ................. B60K 23/00 |
| 11,168,788 | B2* | 11/2021 | Gebert ............... F16H 63/3491 |
| 2018/0142740 | A1* | 5/2018 | Park ..................... F16D 23/04 |
| 2018/0154881 | A1* | 6/2018 | Heubner ............... F16D 65/14 |
| 2020/0309262 | A1* | 10/2020 | Kirchner ............... B60T 1/062 |
| 2021/0362577 | A1* | 11/2021 | Laforce ................ F16H 57/031 |
| 2021/0396311 | A1* | 12/2021 | Greb ................... F16H 63/3458 |
| 2022/0373084 | A1* | 11/2022 | Lien ..................... F16D 63/006 |

* cited by examiner

*Primary Examiner* — David M Fenstermacher

(57) ABSTRACT

An apparatus for avoiding disposition of the clutch of the vehicle speed change device includes a first buffer clutch and a second buffer clutch being located on a clutching cam guide track; the clutching cam guide track being serially arranged with a spring seat and a compressible spring; each of the first buffer clutch and the second buffer clutch including a respective clutching cam set; each of the two clutching cam sets having a respective clutching guide track; the clutching guide track of the first buffer clutch having a parking position for receiving a shift fork; and a protecting ring being installed on the clutching cam set of the first buffer clutch; the protecting ring having a hooking opening capable of receiving the shift fork which shifts to the parking position.

9 Claims, 10 Drawing Sheets

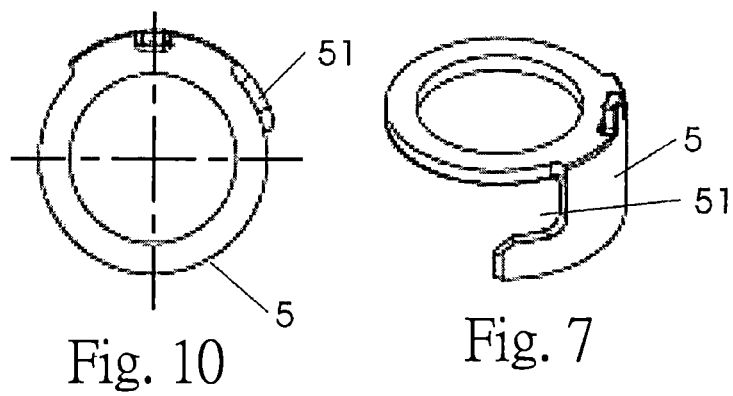
Fig. 10  Fig. 7
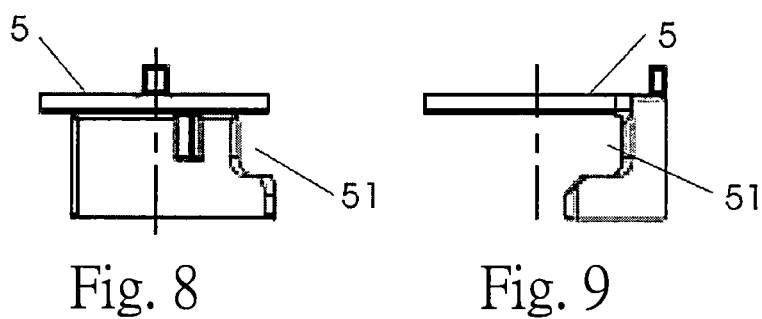
Fig. 8  Fig. 9
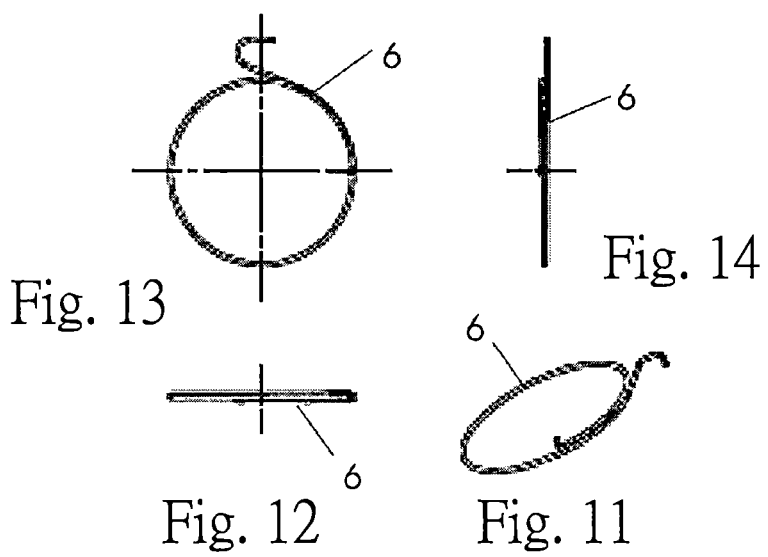
Fig. 13  Fig. 14
Fig. 12  Fig. 11

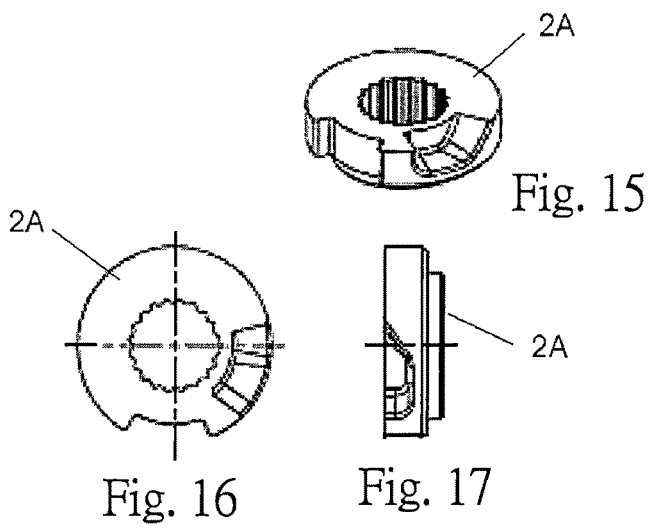
Fig. 15
Fig. 16    Fig. 17
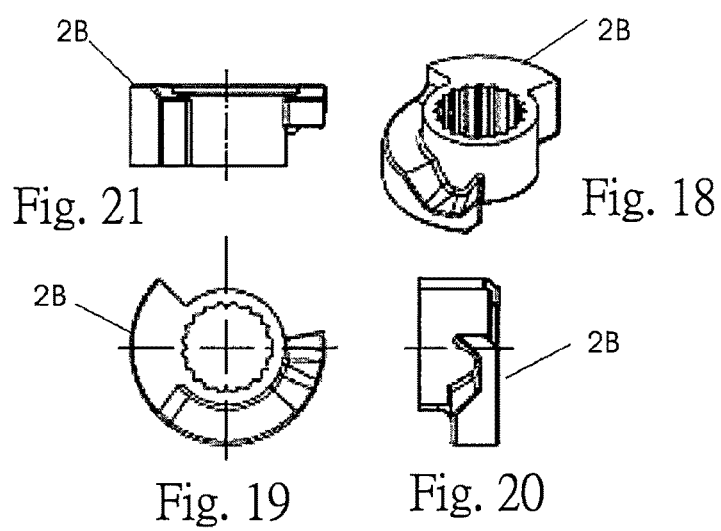
Fig. 21    Fig. 18
Fig. 19    Fig. 20
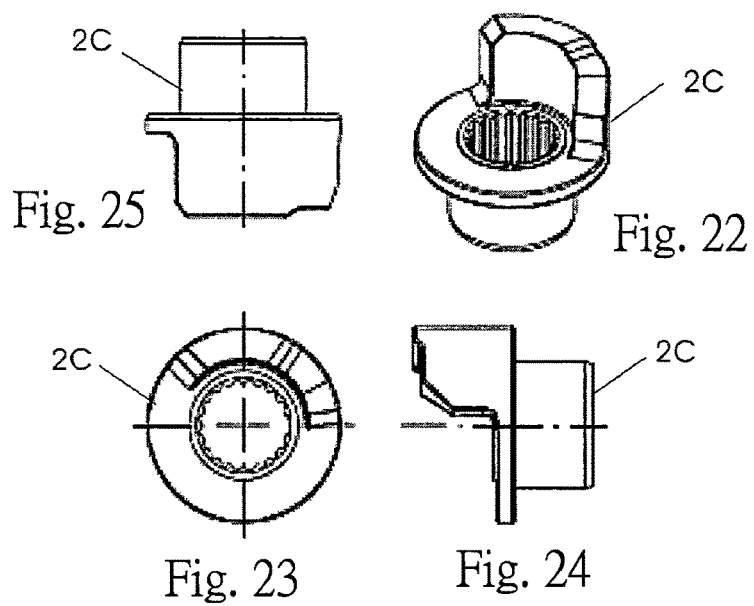
Fig. 25    Fig. 22
Fig. 23    Fig. 24

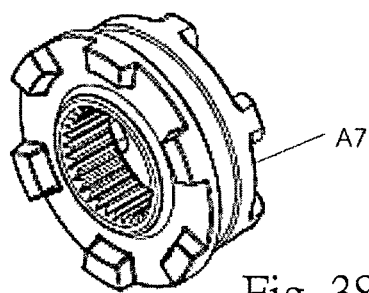
Fig. 38
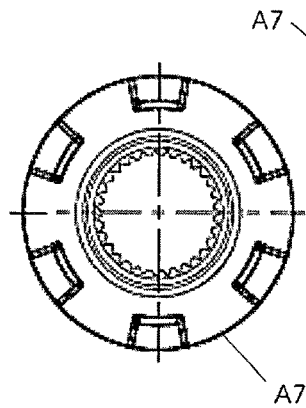 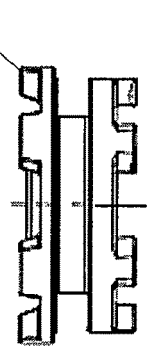 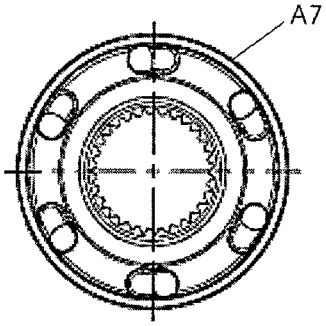
Fig. 40  Fig. 39  Fig. 41
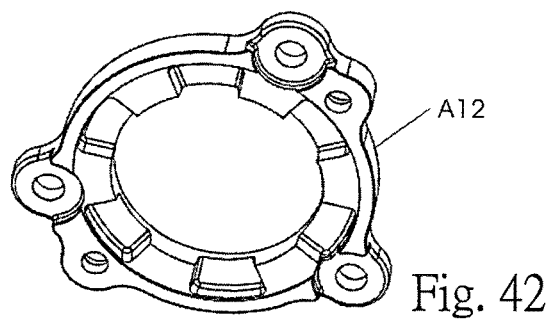
Fig. 42
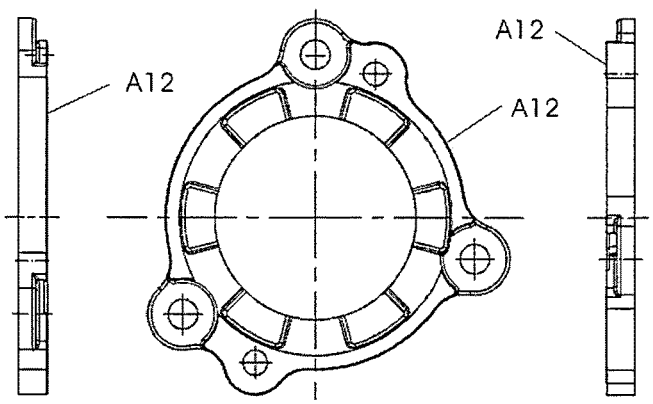
Fig. 44  Fig. 43  Fig. 45

APPARATUS FOR AVOIDING DISPOSITION OF CLUTCH OF VEHICLE SPEED CHANGE DEVICE

FIELD OF THE INVENTION

The present invention is related to apparatus of a clutch of a vehicle speed change device, and in particular to an apparatus for avoiding disposition of a clutch of a vehicle speed change device.

BACKGROUND OF THE INVENTION

Driving of vehicle speed change device of car is executed by rotation of gear shift camshaft. A shift fork is driven to shift by cam guiding groove of the gear shift camshaft so as to execute gear changing of the vehicle speed change device. However, during progress of gear changing, it is easy to cause dislocation due to engagement changing between related shift forks and rotation units of the vehicle speed change device. Therefore, it easily causes wear and fault of these units, and needs to separate the units of the vehicle speed change device for repairing.

To overcome the disadvantage of the above prior art, U.S. Pat. No. 10,041,590B2 provides a structure with single-side buffering. However, due to different torques of the buffered clutch force in U.S. Pat. No. 10,041,590B2, it is not an ideal solution to satisfy the requirement of less wear, small action force and balanced force. Thus the structure also needs to be improved.

As a result, the applicant of the present invention has developed a prior art to improve the disadvantage of the U.S. Pat. No. 10,041,590B2 (referring to FIGS. 1 and 1a). However, in practical application of this prior art, when the gear shift position is switched to parking position and the car is positioned at a ramp or flat road (referring to FIGS. 2 and 2a), it will cause disposition of clutch of vehicle speed change device due to sliding force of the car itself or external force applied to the car (referring to FIGS. 3 and 3a). Therefore, there is an eager demand to have a novel structure to avoid the clutch to be out of position in parking state so as to have high efficiency of space utilization, simple structure, low costs and light weights.

SUMMARY OF THE INVENTION

Accordingly, the object of the present invention is to provide an apparatus for avoiding disposition of a clutch of a vehicle speed change device, wherein advantages of the present invention has following are that the structure of the present invention provides a safe structure which avoids disposition at the parking position of clutch of vehicle speed change device during parking shifting operation of the shift fork so as to have high efficiency of space utilization, simple structure, low costs and light weights. The structure of the present invention also has high safety, practicability, industrial utilization and economic benefits.

To achieve above object, the present invention provides an apparatus for avoiding disposition of a clutch of a vehicle speed change device comprising a first buffer clutch and a second buffer clutch being located on a clutching cam guide track; the clutching cam guide track being serially arranged with a spring seat and a compressible spring; each of the first buffer clutch and the second buffer clutch including a respective clutching cam set; the clutching cam set of the first buffer clutch being located at a right side of the clutching cam set of the second buffer clutch; each of the two clutching cam sets having a respective clutching guide track; the clutching guide track of the first buffer clutch having a parking position for receiving a shift fork; and a protecting ring being installed on the clutching cam set of the first buffer clutch; the protecting ring having a hooking opening capable of receiving the shift fork which shifts to the parking position of the first buffer clutch.

BRIEF DESCRIPTION OF THE DRAWINGS

FIG. 7 is a schematic view of the protecting ring of the embodiment of the present invention.

FIG. 8 is a front side view of the protecting ring of the embodiment of the present invention.

FIG. 9 is a right side view of FIG. 8.

FIG. 10 is a top plan view of FIG. 8.

FIG. 11 is a schematic view of the returning spring of the protecting ring of the embodiment of the present invention.

FIG. 12 is a front side view of the returning spring of the protecting ring of the embodiment of the present invention.

FIG. 13 is a top plan view of FIG. 12.

FIG. 14 is a right side view of FIG. 13.

FIG. 15 is a schematic view of the right clutching cam of the first buffer clutch of the embodiment of the present invention.

FIG. 16 is a top plan view of the right clutching cam of the first buffer clutch of the embodiment of the present invention.

FIG. 17 is a right side view of FIG. 16.

FIG. 18 is a schematic view of the central clutching cam of the first buffer clutch of the embodiment of the present invention.

FIG. 19 is a side view of the central clutching cam of the first buffer clutch of the embodiment of the present invention.

FIG. 20 is a right side view of FIG. 19.

FIG. 21 is a top plan view of FIG. 19.

FIG. 22 is a schematic view of the left clutching cam of the first buffer clutch of the embodiment of the present invention.

FIG. 23 is a side view of the left clutching cam of the first buffer clutch of the embodiment of the present invention.

FIG. 24 is a right side view of FIG. 23.

FIG. 25 is a top plan view of FIG. 23.

FIG. 38 is a schematic view of the claw-shaped clutch of the present invention.

FIG. 39 is a front side view of the claw-shaped clutch of the present invention.

FIG. 40 is a left side view of FIG. 39.

FIG. 41 is a right side view of FIG. 39.

FIG. 42 is a schematic view of the stop gear block of the present invention.

FIG. 43 is a front side view of the stop gear block of the present invention.

FIG. 44 is a left side view of FIG. 43.

FIG. 45 is a right side view of FIG. 43.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1A:
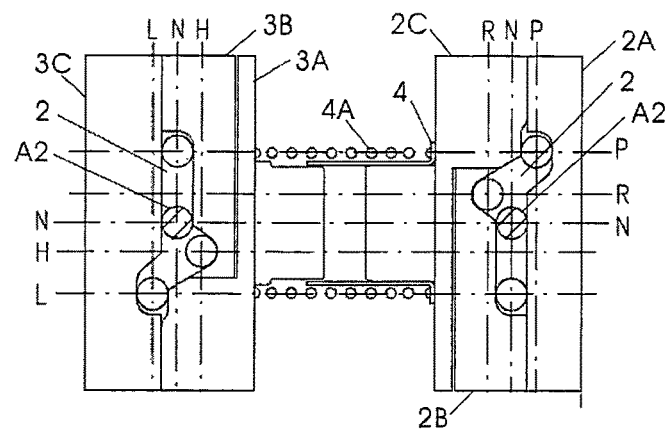
FIG. 1a is an expanded view of the embodiment of the first buffer clutch and the second buffer clutch of the prior art in FIG. 1.
Figure 1:
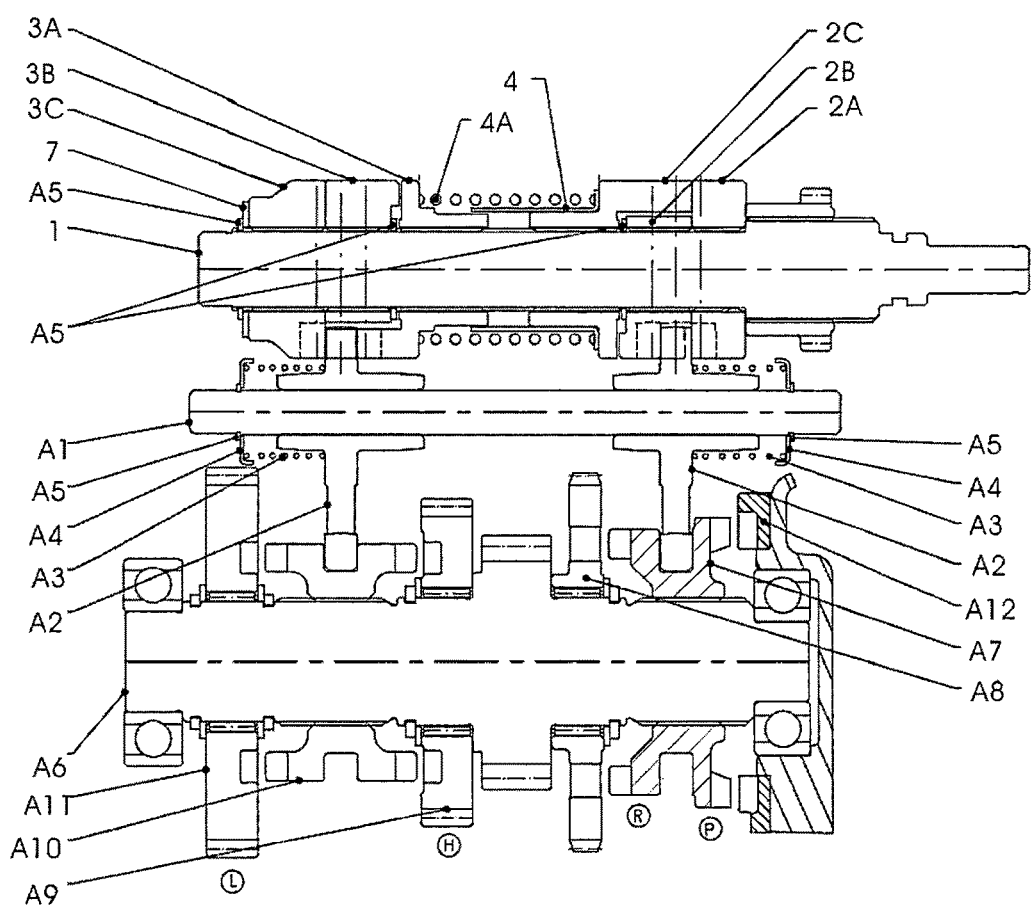
FIG. 1 is a cross sectional view of the embodiment of the prior art.
Figure 2A:
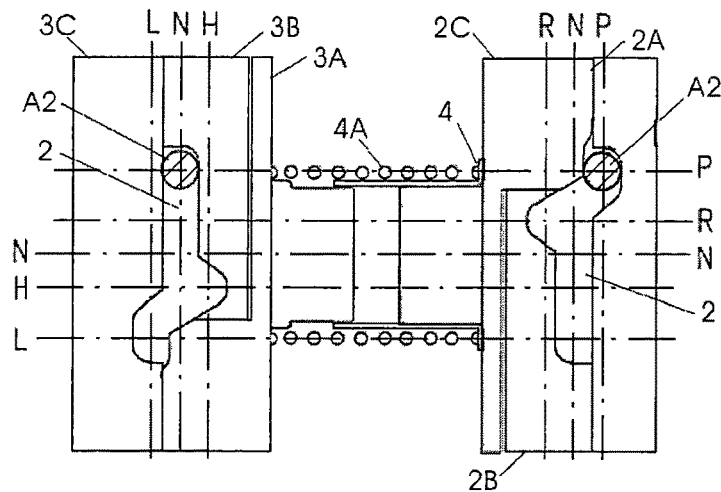
FIG. 2a is an expanded view of the clutching guide track of the prior art in FIG. 2.
Figure 2:
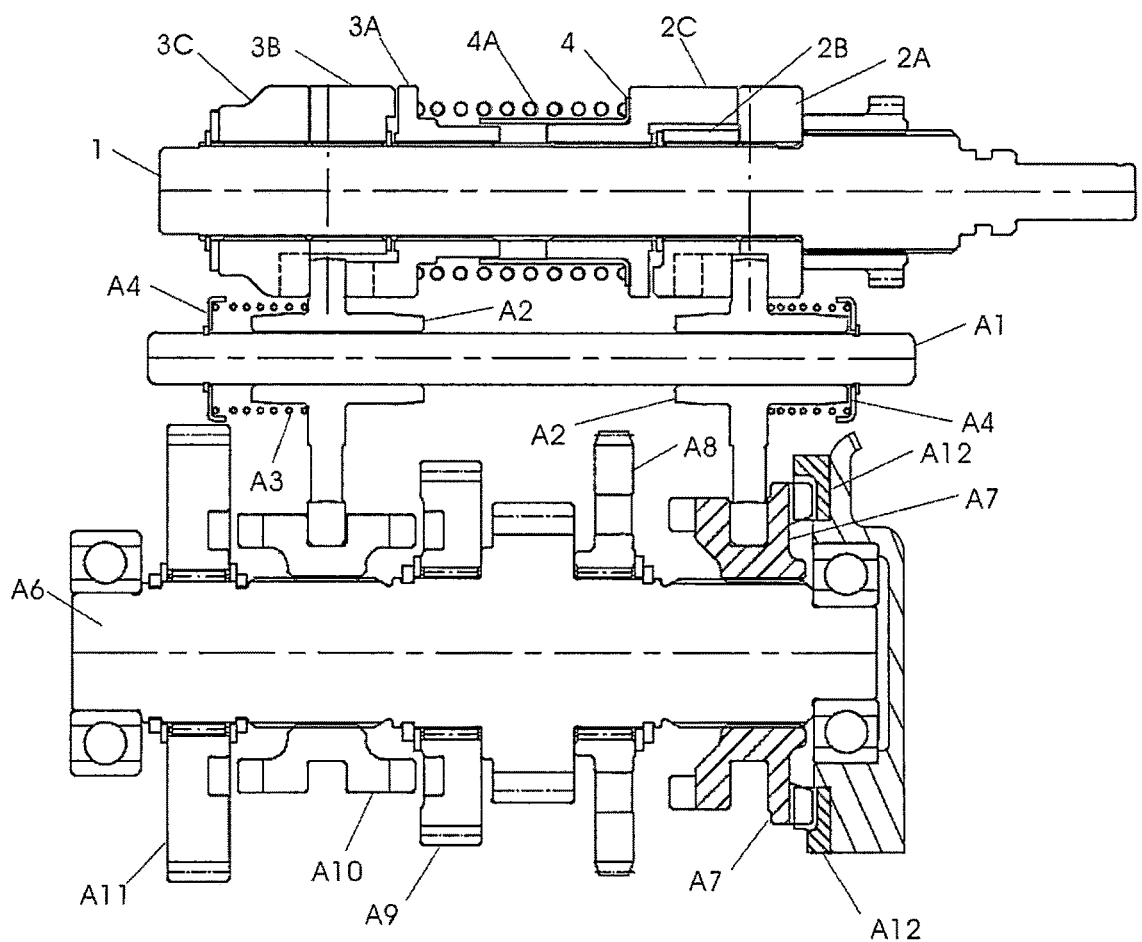
FIG. 2 is a cross sectional view showing parking state of the embodiment of the prior art in FIG. 1.
Figure 3A:
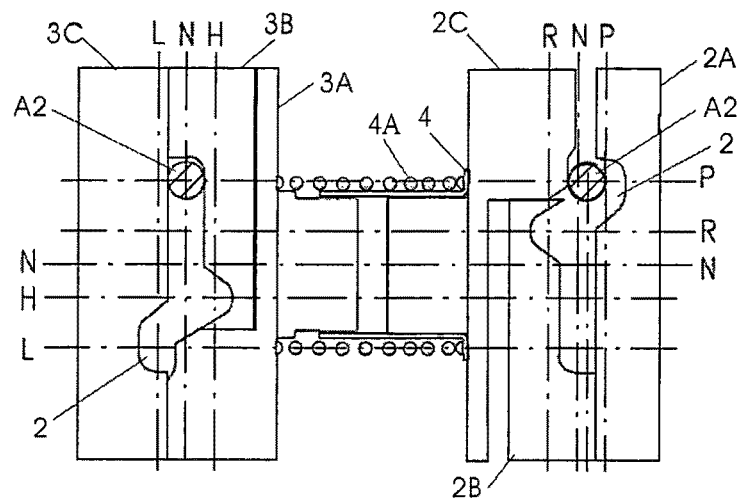
FIG. 3a is an expanded view of the clutching guide track of the prior art in FIG. 3.
Figure 3:
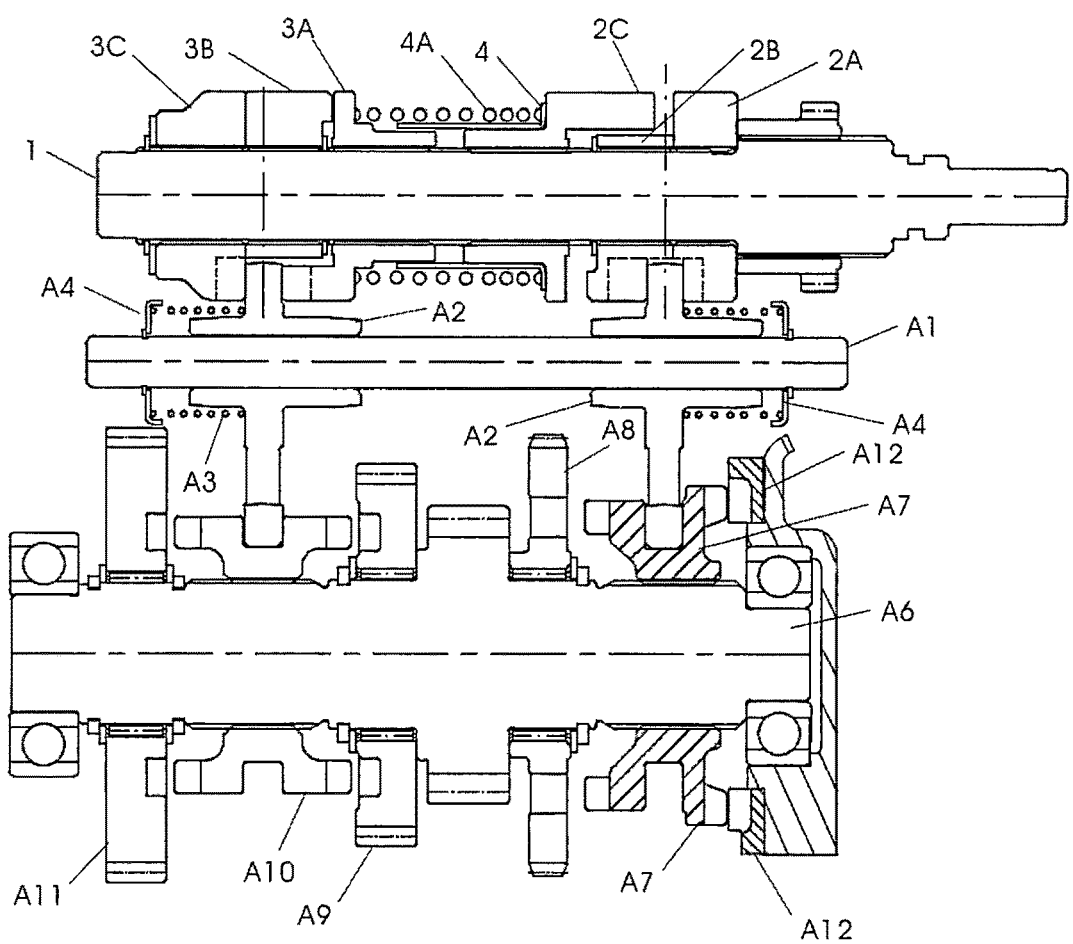
FIG. 3 is a cross sectional view of the embodiment of the prior art in FIG. 1, which shows that the gear is out of positon.
Figure 4A:
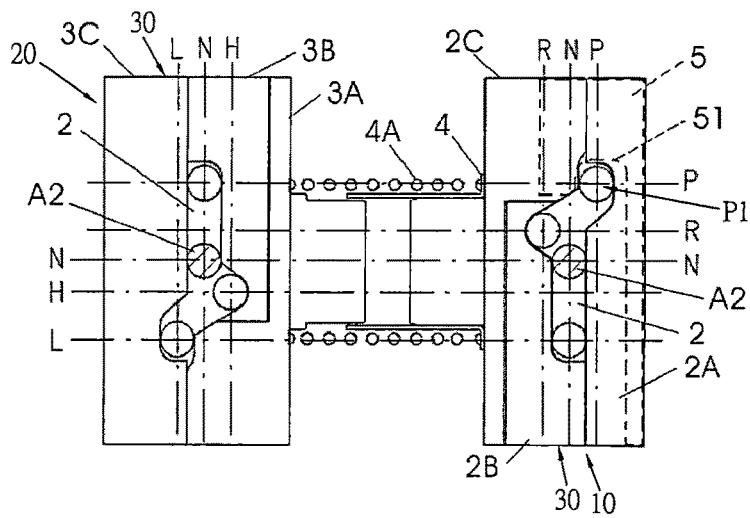
FIG. 4a is an expanded view of the clutching guide track of the present invention.
Figure 4:
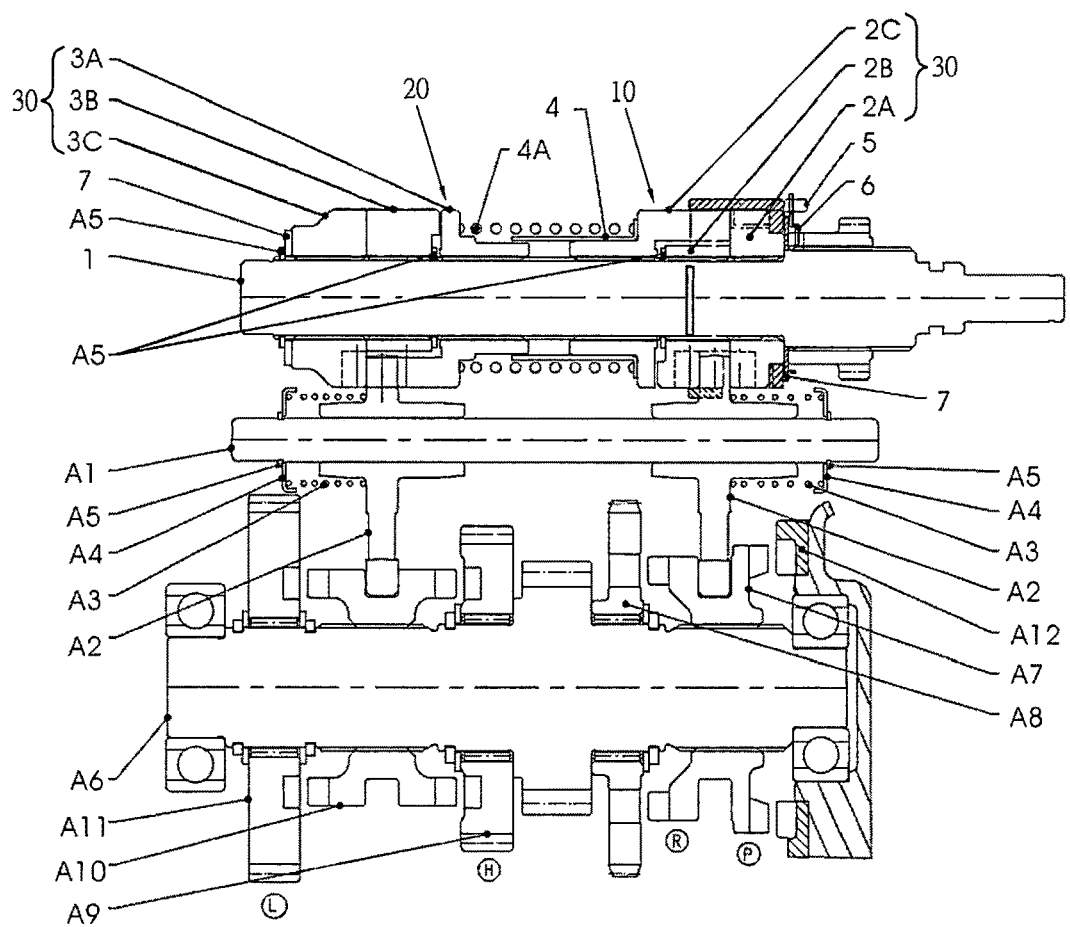
FIG. 4 is a cross sectional view of the embodiment of the present invention.
Figure 5A:
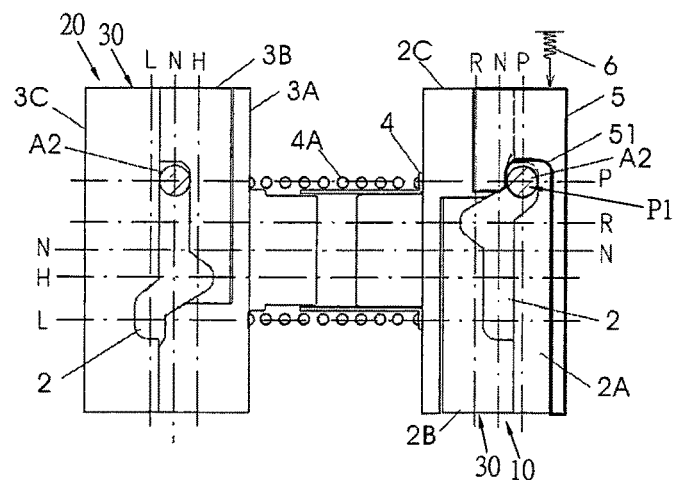
FIG. 5a is an expanded view showing parking state of the clutching guide track of the present invention.
Figure 5:
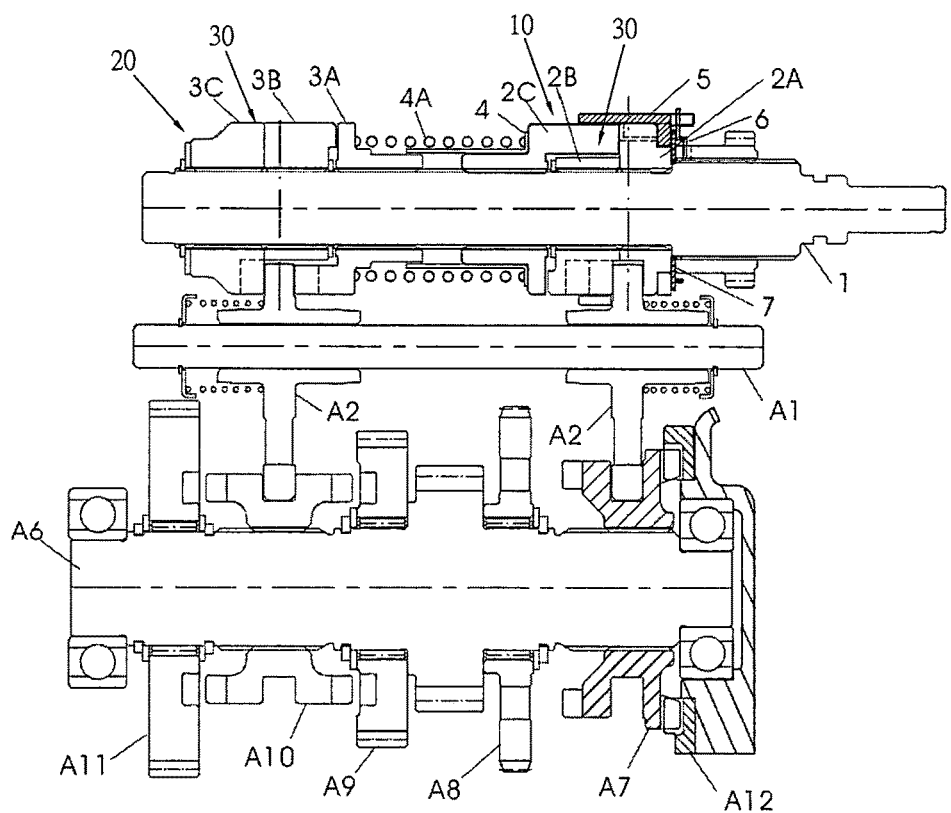
FIG. 5 is a cross sectional view showing parking state of the embodiment of the present invention.
Figure 6:
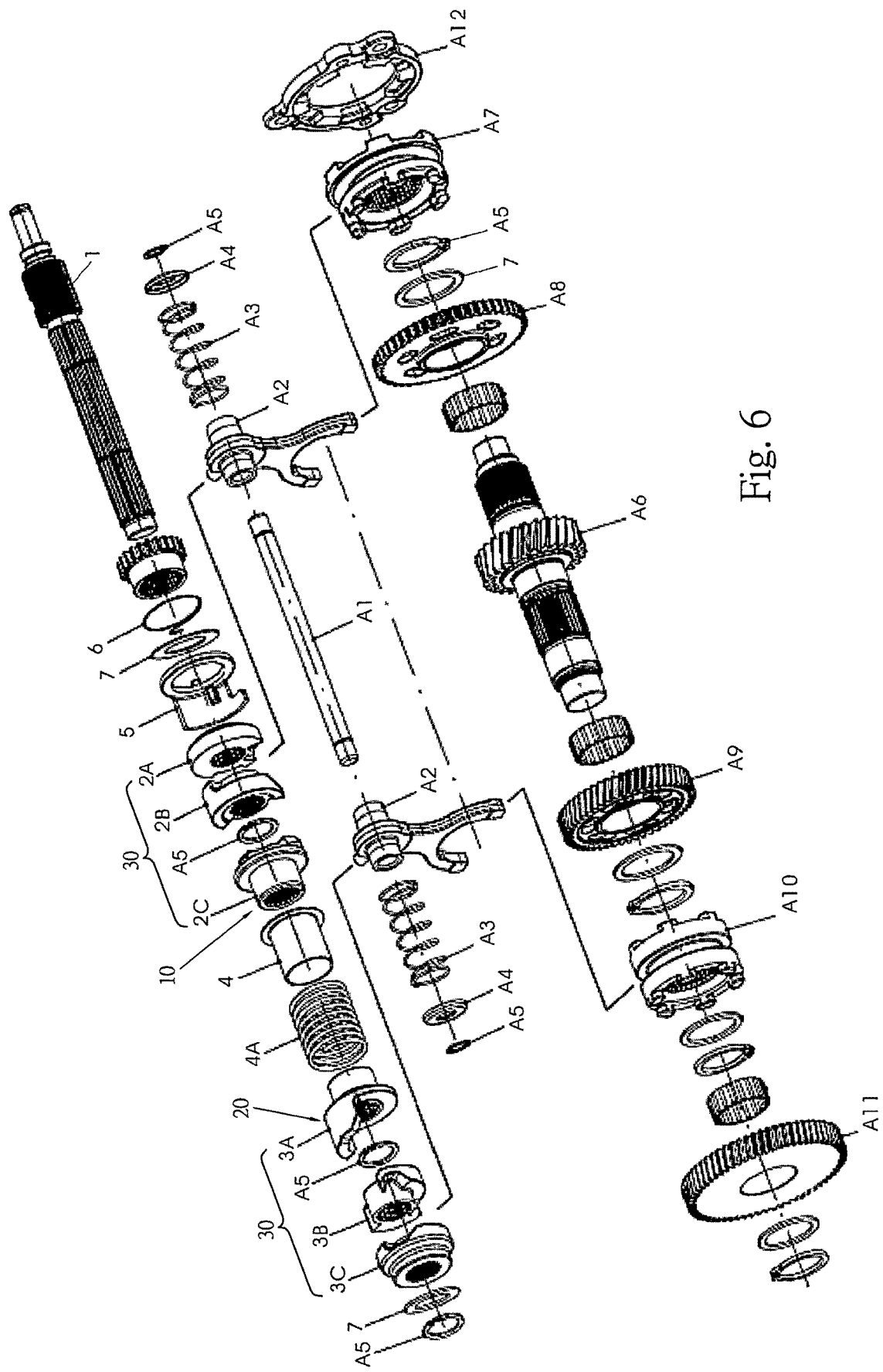
FIG. 6 is an exploded view of the embodiment of the present invention.
Figure 29:
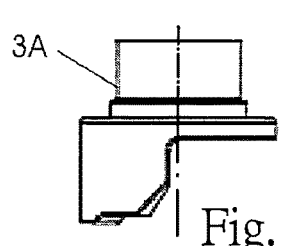
FIG. 29 is a top plan view of FIG. 27.
Figure 26:
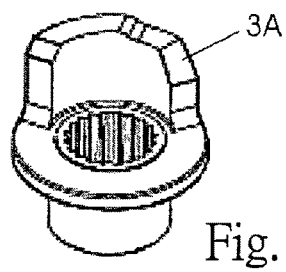
FIG. 26 is a schematic view of the right clutching cam of the second buffer clutch of the embodiment of the present invention.
Figure 27:
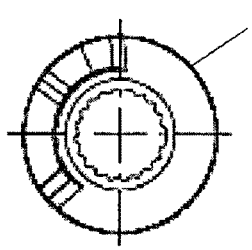
FIG. 27 is a side view of the right clutching cam of the second buffer clutch of the embodiment of the present invention.
Figure 28:
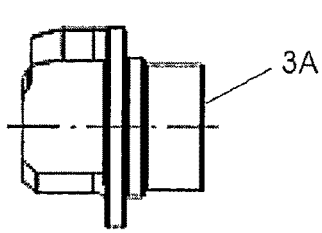
FIG. 28 is a right side view of FIG. 27.
Figure 33:
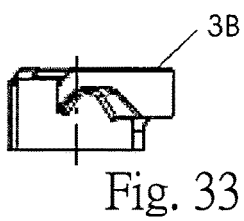
FIG. 33 is a top plan view of FIG. 31.
Figure 30:
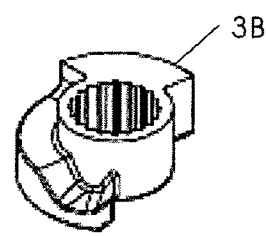
FIG. 30 is a schematic view of the central clutching cam of the second buffer clutch of the embodiment of the present invention.
Figure 31:
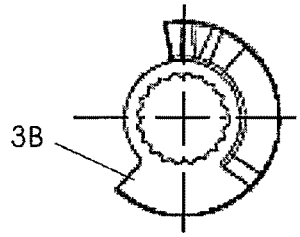
FIG. 31 is a side view of the central clutching cam of the second buffer clutch of the embodiment of the present invention.
Figure 32:
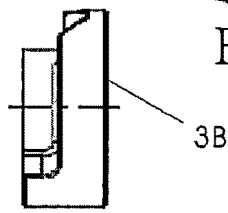
FIG. 32 is a right side view of FIG. 31.
Figure 35:
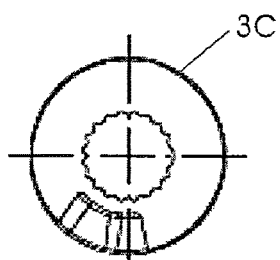
FIG. 35 is a side view of the left clutching cam of the second buffer clutch of the embodiment of the present invention.
Figure 36:
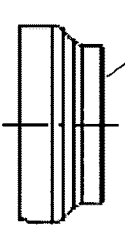
FIG. 36 is a right side view of FIG. 35.
Figure 34:
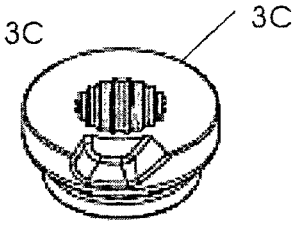
FIG. 34 is a schematic view of the left clutching cam of the second buffer clutch of the embodiment of the present invention.
Figure 37:
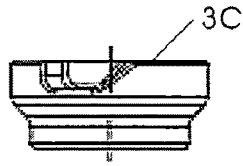
FIG. 37 is a top plan view of FIG. 35.

With reference to FIGS. 4 to 6, the structure of the present invention is illustrated. The present invention comprises a clutching cam guide track 1, a first buffer clutch 10, a second buffer clutch 20, a spring seat 4, a compressible spring 4A, a protecting ring 5, a returning spring 6 and a pad 7. A plurality of components are described for cooperating the content of the embodiment. These components contain a shift fork guide track A1, a shift fork A2, a compressible spring A3, a ring pad A4, a C-shaped buckling ring A5, a second rod A6, a claw-shaped clutch A7, a sprocket A8, a high speed gear A9, a claw-shaped clutch A10, a low speed gear A11 and a stop gear block A12.

The first buffer clutch 10 and the second buffer clutch 20 are located on the clutching cam guide track 1. The clutching cam guide track 1 is serially arranged with the spring seat 4 and the compressible spring 4A.

Each of the first buffer clutch 10 and the second buffer clutch 20 includes a respective clutching cam set 30. The clutching cam set 30 of the first buffer clutch 10 is located at a right side of the clutching cam set 30 of the second buffer clutch 20. Each of the two clutching cam sets 30 has a respective clutching guide track 2. The clutching guide track 2 of the first buffer clutch 10 has a parking position P1 for receiving the shift fork A2.

The clutching cam set 30 of the first buffer clutch 10 includes a right clutching cam 2A (referring to FIGS. 15 to 17), a central clutching cam 2B (referring to FIGS. 18 to 21) and a left clutching cam 2C (referring to FIGS. 22 to 25). The central clutching cam 2B is located between the right clutching cam 2A and the left clutching cam 2C.

The clutching cam set 30 of the second buffer clutch 20 includes a right clutching cam 3A (referring to FIGS. 26 to 29), a central clutching cam 3B (referring to FIGS. 30 to 33) and a left clutching cam 3C (referring to FIGS. 34 to 37). The central clutching cam 3B is located between the right clutching cam 3A and the left clutching cam 3C.

The spring seat 4 and the compressible spring 4A are located between the left clutching cam 2C and the right clutching cam 3A (referring to FIG. 4).

The protecting ring 5 is installed on the right clutching cam 2A of the first buffer clutch 10. The protecting ring 5 has a hooking opening 51 capable of receiving the shift fork A2 which shifts to the parking position P1 of the first buffer clutch 10. The protecting ring 5 is installed with the returning spring 6. The washer 7 is located between the returning spring 6 and the right clutching cam 2A of the clutching cam set 30 of the first buffer clutch 10. A first end of the returning spring 6 is positioned at the protecting ring 5 and a second end of the returning spring 6 is positioned at the clutching cam guide track 1. An opening direction of the hooking opening 51 is different from a clutching direction of the clutching cam set 30 of the first buffer clutch 10. An inner diameter of the hooking opening 51 is larger than that of the clutching guide track 2 of the clutching cam set 30 of the first buffer clutch 10.

As shown in FIGS. 5 and 5a, when a gear stick of a car is switched, the clutching cam guide track 1 rotates to drive the shift fork A2 to shift to the parking position P1 of the clutching guide track 2 of the clutching cam set 30 of the first buffer clutch 10. Because the direction of the hooking opening 51 is different from the clutching direction of the clutching cam set 30 of the first buffer clutch 10, the shift fork A2 is hooked by the hooking opening 51 of the protecting ring 5 to avoid the shift fork A2 to be separated from the clutching cam set 30 of the first buffer clutch 10. This is caused by the clutching cam set 30 being pushed away by the shift fork A2 with the sliding force of the car itself or external force when the car is stop on a ramp or a flat road. As a result, danger induced from disposition at the parking position of the first buffer clutch 10 can be avoided.

Moreover, to guarantee smooth movement of the shift fork A2 to the hooking opening 51, the returning spring 6 is installed on the protecting ring 5. When the shift fork A2 shifts to the parking position P1, the shift fork A2 contacts the protecting ring 5 and the protecting ring 5 moves backwards so that the shift fork A2 can shift to the parking position P1 smoothly, and then the protecting ring 5 moves forwards subsequently by the returning spring 6 to hook the shift fork A2 which is positioned at the parking position P1.

Advantages of the present invention has following are that the structure of the present invention provides a safe structure which avoids disposition at the parking position of the clutch of the vehicle speed change device during parking shifting operation of the shift fork so as to have high efficiency of space utilization, simple structure, low costs and light weights. The structure of the present invention also has high safety, practicability, industrial utilization and economic benefits.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An safe apparatus for a clutch of a vehicle speed change device comprising:
    a first buffer clutch and a second buffer clutch being located on a clutching cam guide track; the clutching cam guide track being serially arranged with a spring seat and a compressible spring; each of the first buffer clutch and the second buffer clutch including a respective clutching cam set; the clutching cam set of the first buffer clutch being located at a right side of the clutching cam set of the second buffer clutch; each of the two clutching cam sets having a respective clutching guide track; the clutching guide track of the first buffer clutch having a parking position for receiving a shift fork; and
    a protecting ring being installed on the clutching cam set of the first buffer clutch; the protecting ring having a hooking opening capable of receiving the shift fork which shifts to the parking position of the first buffer clutch.

2. The safe apparatus for the clutch of the vehicle speed change device as claimed in claim 1, wherein the clutching cam set of the first buffer clutch includes a right clutching cam, a central clutching cam and a left clutching cam; the central clutching cam is located between the right clutching cam and the left clutching cam.

3. The safe apparatus for the clutch of the vehicle speed change device as claimed in claim 2, wherein the clutching cam set of the second buffer clutch includes a right clutching cam, a central clutching cam and a left clutching cam; the central clutching cam is located between the right clutching cam and the left clutching cam.

4. The safe apparatus for the clutch of the vehicle speed change device as claimed in claim 3, wherein the spring seat and the compressible spring are located between the left clutching cam of the clutching cam set of the first buffer clutch and the right clutching cam of the clutching cam set of the second buffer clutch.

5. The safe apparatus for the clutch of the vehicle speed change device as claimed in claim 1, wherein the protecting ring is installed with a returning spring; an opening direction of the hooking Opening is different from a clutching direction of the clutching cam set of the first buffer clutch.

6. The safe apparatus for the clutch of the vehicle speed change device as claimed in claim 1, wherein an inner diameter of the hooking opening is larger than that of the clutching guide track of the clutching cam set of the first buffer clutch.

7. The safe, apparatus for the clutch of the vehicle speed change device as claimed in claim 2, wherein the protecting ring being installed on the right clutching cam of the clutching cam set of the first buffer clutch.

8. The safe apparatus for the clutch of the vehicle speed change device as claimed in claim 5, wherein a first end of the returning spring is positioned at the protecting ring and a second end of the returning spring is positioned at the clutching cam guide track.

9. The safe apparatus for the clutch of the vehicle speed change device as claimed in claim 5, further comprising a washer being located between the returning spring and the clutching cam set of the first buffer clutch.

* * * * *